United States Patent [19]

Ellis et al.

[11] Patent Number: 5,015,998
[45] Date of Patent: May 14, 1991

[54] NULL SEEKING POSITION SENSOR

[75] Inventors: George H. Ellis, Blacksburg; James C. Kirby, Radford, both of Va.

[73] Assignee: Kollmorgen Corporation, Simsbury, Conn.

[21] Appl. No.: 391,430

[22] Filed: Aug. 9, 1989

[51] Int. Cl.[5] .................................. G08B 21/00
[52] U.S. Cl. .................. 340/686; 324/207.17; 336/87; 336/134
[58] Field of Search ............. 340/686; 324/207.17, 324/207.18, 207.24; 336/87, 134

[56] References Cited

U.S. PATENT DOCUMENTS 3,205,485 9/1965 Noltingk ................. 324/207.17
4,737,698 4/1988 McMullin et al. ............. 318/653

Primary Examiner—Glen R. Swann, III
Attorney, Agent, or Firm—Morgan & Finnegan

[57] ABSTRACT

A position sensor includes of two primary sense windings for establishing a forward or drive field, two secondary sense windings in which a voltage may be induced in the presence of the drive field, and at least one conductive screen capable of blocking the magnetic coupling between the primary and secondary sense windings. When the screen blocks the magnetic coupling between one pair of sense windings to the same extent that ti does between the other pair of sense windings, the sensor circuitry generates a marker signal to indicate the position of the screen.

6 Claims, 2 Drawing Sheets

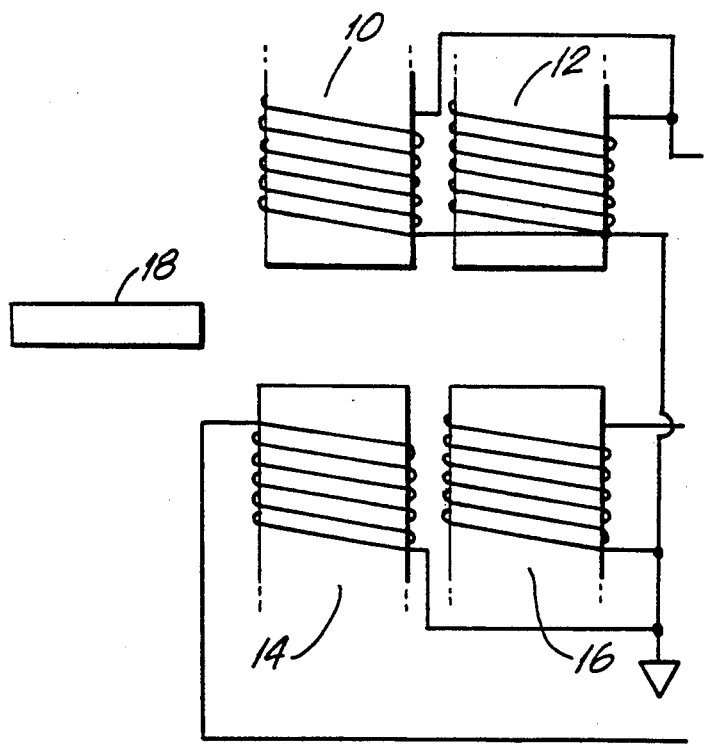
FIG.2A
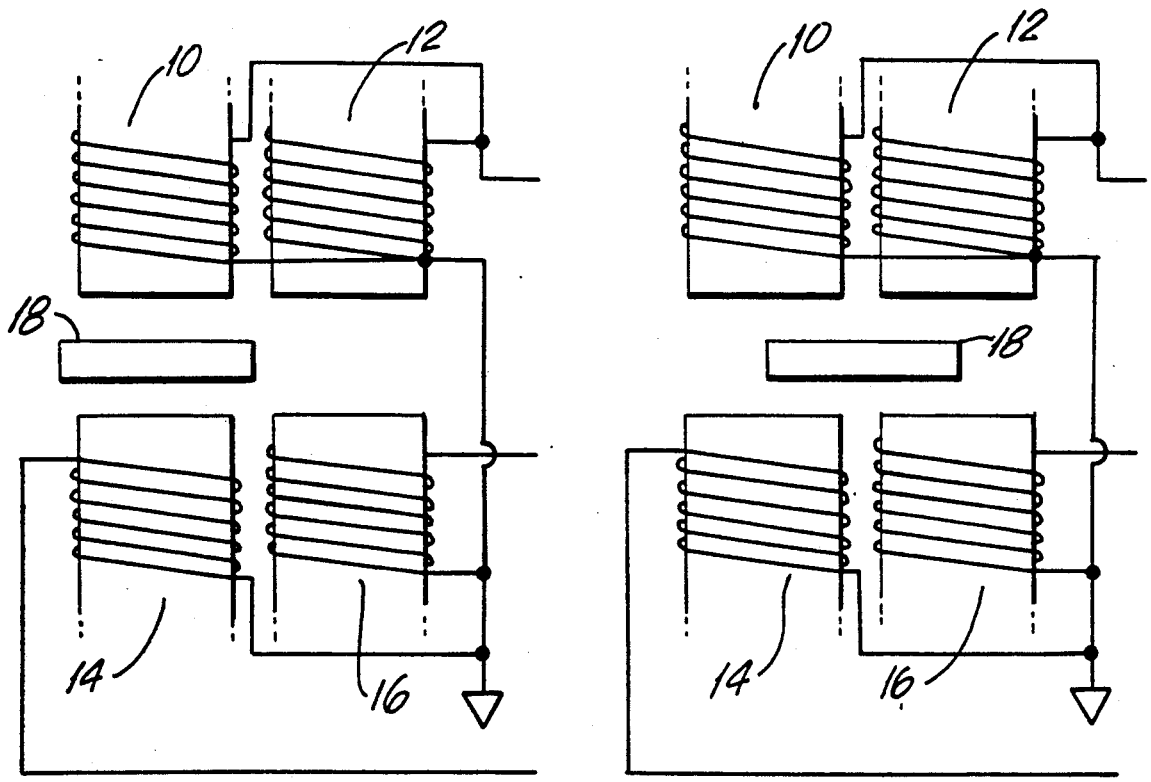
FIG.2B
FIG.2C

NULL SEEKING POSITION SENSOR

FIELD OF THE INVENTION

This invention relates to sensors, in particular position sensors. Position sensors provide signals indicative of the position of a moving member with which they are associated relative to some fixed location.

The invention also relates to sensors for use with electrical machines, such as, inter alia, brushless d.c. drives and synchronous motors. Machines and drives of these kinds are used in machine tool positioning and robots, and in addition to these applications, angle sensing in general and motor commutation represent further favored fields of use.

BACKGROUND OF THE INVENTION

There are available position and speed sensors that include absolute and incremental digital encoders, resolvers based on the varying mutual inductances of windings moved relative to one another, variable-capacitance devices, hall devices sensing permanent-magnet fields, and inductosyn type transducers.

For some applications, however, these solutions for position sensing may be too costly or unreliable in hostile environments, particularly where the application requires detection of only one specific angular or linear position.

A more recent invention in position sensors employs the screened magnetic coupling technique. According to this technique, a properly dimensioned conductive screen is attached to a rotating or linearly moving object such that the screen can pass through an air gap between at least two pairs of magnetically coupled coils. When the screen moves into the air gap, it blocks the magnetic coupling between the coils thereby reducing the induced voltage in at least one of the coils. From this varying voltage, the position of the screen can be determined.

A position sensor utilizing this technique that provides a continuous stream of analog or digitally coded position signals is shown in U.S. Pat. No. 4,737,698, entitled "Position and Speed Sensors", issued on Apr. 12, 1988.

BRIEF SUMMARY OF THE INVENTION

A position sensor incorporating the present invention provides a marker signal indicative of when a screen member interrupts a field at a selected position among corresponding drive and sense windings.

Accordingly, it is an object of the present invention to provide a position sensor that can detect a specific angular position of a rotating object.

It is a further object of the invention to provide a position sensor that can detect a specific linear position of a linearly moving object.

It is another object of the invention to provide a low cost position sensor that is extremely accurate with substantially no thermal drift or hysteresis.

According to the invention, there is provided a sensing apparatus comprising two primary sense windings for establishing a forward or drive field, two secondary sense windings in which a voltage may be induced in the presence of the drive field, and at least one conductive screen within which, in the presence of the drive field, eddy currents are generated that establish a counter-field which opposes the drive field. The screen and secondary sense windings are displaceable relative to one another within the drive field so that the secondary sense windings may be shaded by the screen to a varying extent to vary the voltage induced in the secondary sense windings.

When the screen blocks the magnetic coupling between one pair of sense windings to the same extent that it does between the other pair of sense windings, the sensor circuitry generates a marker signal to indicate the position of the screen.

BRIEF DESCRIPTION OF THE DRAWINGS

The following drawings, along with the detailed description, serve to illustrate the invention wherein:

FIG. 2A is a view of the screen at one position;

FIG. 2B is a view of the screen at another position;

FIG. 2C is a view of the screen at a third position.

DETAILED DESCRIPTION

Figure 1:
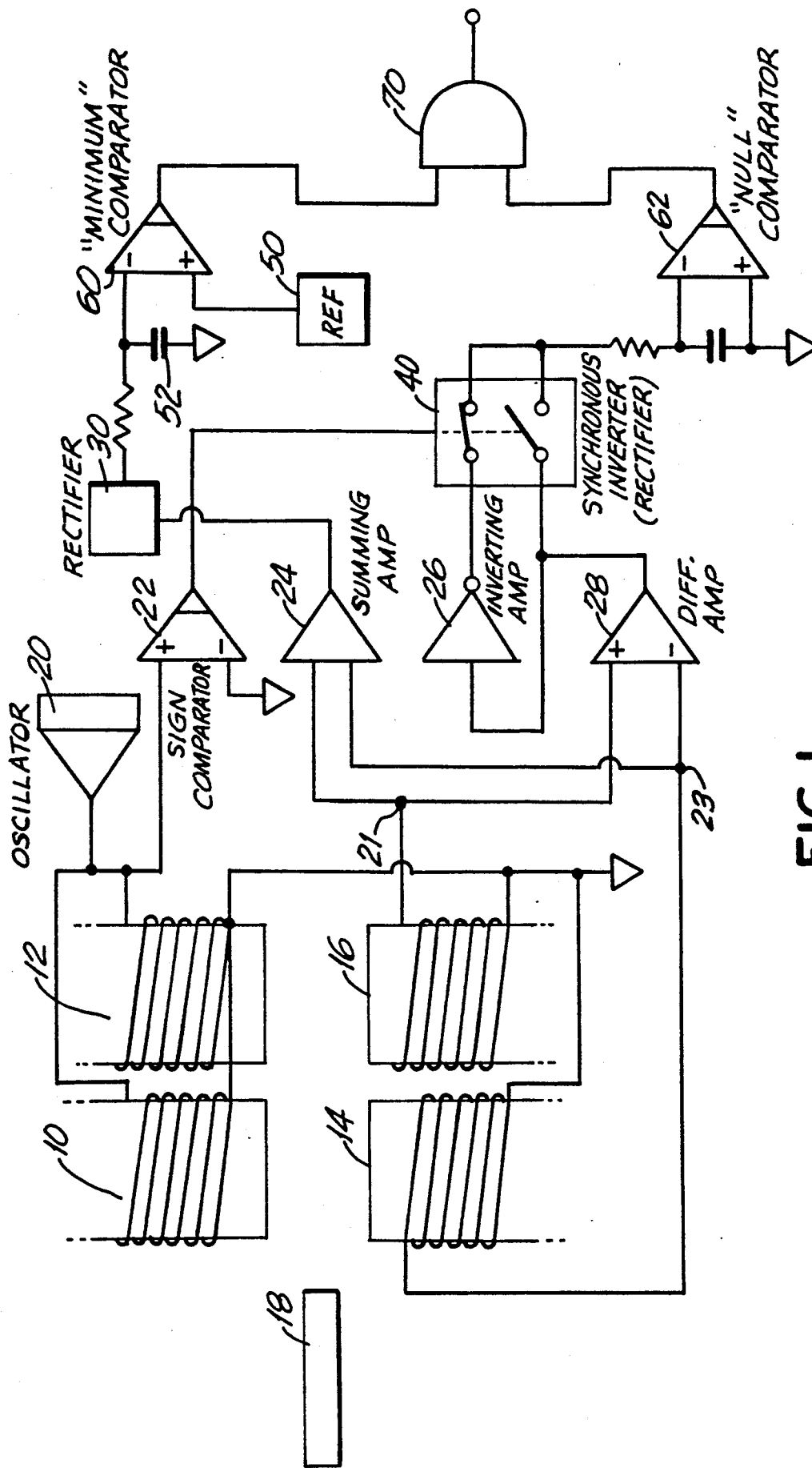
FIG. 1 is a block diagram of a position sensor built according to the invention.

The invention will be described by first explaining the physical layout of a position sensor built according to this invention and then explaining how the circuit operates.

FIG. 1 shows a block diagram in which an illustrative two primary sense windings 10 and 12 and two secondary sense windings 14 and 16 are separated by an air gap. Through this air gap, a screen 18 which is connected to a rotating or linearly moving object can pass.

An oscillator 20 drives both of the primary sense windings 10 and 12. Also, since the signal generated in the secondary sense windings 14 and 16 has the same frequency as that of the oscillator 20, the oscillator 20 controls a rectifying circuit that synchronously rectifies the signal that represents the difference between the signal from secondary winding 16 and that from secondary winding 14. To control the synchronous rectifying circuit, the oscillator 20 output connects to a sign comparator 22. This sign comparator 22 controls the synchronous rectifier 40.

Each secondary sense winding 14 and 16 is connected to both a difference amplifier 28 and a summing amplifier 24. The difference amplifier 28 output feeds into the synchronous rectifier 40 both directly and through an inverting amplifier 26. The output of the synchronous inverter 40 feeds into a null comparator 62.

A rectifier 30 circuit rectifies the summing amplifier's 24 output. This rectified signal feeds into a minimum comparator 60. To supply the reference voltage to the minimum comparator 60, it is also connected to a reference source 50. The reference source 50 voltage must be chosen such that the output of the minimum comparator 60 is at V(1) when the screen 18 is at a field interrupting position and the output of the minimum comparator 60 is at V(0) when the screen 18 is outside a field interrupting position.

The output of both the null comparator 62 and the minimum comparator 60 feed into an AND circuit 70, the output of which indicates the position of the rotating or linearly moving object.

Against this background of the physical layout of the position sensor shown in FIG. 1, its operation can be explained. The circuit provides different output signals based upon the location of the screen 18 relative to the sensing coils 10, 12, 14, and 16. Therefore, the circuit behavior is illustratively explained for three different positions of the screen 18, these three screen positions are shown in FIG. 2A, FIG. 2B, and FIG. 2C.

Regardless of screen position, the oscillator 20 drives the primary sense windings 10 and 12. When the screen 18 is at the position shown in FIG. 2A, primary sense windings 10 induces substantially the same voltage in secondary sense winding 14 that primary sense winding 12 induces in secondary sense winding 16. In short, at point 21 the voltage substantially equals that at point 23.

Since those voltage are substantially equal, the output of the difference amplifier 28 essentially equals zero. Similarly, the output of the synchronous rectifier 40 essentially equals zero, which causes, the output of the null comparator 62 to go to V(1).

The summing amplifier 24 adds the voltage at point 21 to that at point 23. The resulting signal passes through a rectifier and charges a capacitor 52. With the screen at the position shown in FIG. 2A, the voltage across capacitor 52 exceeds the reference voltage 50; this causes the minimum comparator 60 to go to V(0).

With the minimum comparator 60 at V(0) and the null comparator 62 V(1), the output of the AND circuit 70, and therefore the output of the position sensor, remains V(0).

As the screen 18 travels towards the sensing winding 10, 12, 14, and 16, it eventually reaches the position shown in FIG. 2B. At this point, the screen 18 substantially prevents a voltage signal from being induced in secondary sensing winding 14. Therefore, the voltage signal at point 21 does not equal to that voltage signal at point 23.

Since those voltages are not equal, the difference amplifier 28 generates a non-zero output. This output signal, after it is synchronously rectified, causes the null comparator's 62 output to go to V(0).

The minimum comparator 60, however, goes to V(1). Since almost no voltage is induced in secondary sensing coil 14, the rectified output of the summing amplifier 24 charges the capacitor 52 to a voltage below the reference voltage 50. When this occurs, the output of the AND 70 circuit goes to V(0).

With the screen at the position shown in FIG. 2B, the minimum comparator goes to V(1) and the null comparator goes to V(0) Therefore, the output of the AND 70 circuit goes to V(0).

The screen 18 eventually reaches the point where it blocks the magnetic coupling between primary sense winding 10 and secondary sense winding 14 to the same extent that it does between primary sense winding 12 and secondary sense winding 16. At the point, shown in FIG. 2C, voltage signal at location 21 substantially equals to voltage signal at location 23.

When these two signals are substantially equal, the output of the difference amplifier 28 goes approximately to zero. This causes the null comparator 62 to go to V(1).

The voltage across the capacitor 52 remains below the reference voltage 50. Therefore, the minimum comparator 60 remains at v(1).

With both the null comparator 62 and the minimum comparator 60 at V(1), the AND circuit 70, and therefore the position sensor, output goes to V(1). This indicates that the screen is at the position shown in FIG. 2C.

What has been described is a position sensor which provides a signal when the screen member interrupts a field at a selected position among corresponding drive and sense winding. It would be apparent to those skilled in the art that there are many variations that come within the scope of the invention. AcCordingly the invention is to be limited only as particularly defined in the claims.

We claim:

1. A position sensor comprising:
   A pair of primary sense windings;
   A pair of secondary sense windings, said pair of primary sense windings separated by an air-gap from said pair of secondary sense windings;
   At least one screen member of material capable of interrupting a magnetic drive field and adapted to be positioned in said air gap in correlation with the position of a moving member being sensed;
   Oscillator drive means applying current in parallel to said pair of primary sense windings, said current in said pair of primary sense windings electrically inducing corresponding current in said pair of secondary sense windings; and
   Circuit means for detecting the presence of said screen member within said air gap, said circuit means providing an indication when said screen member is located at a certain position within said air gap.

2. A position sensor comprising:
   A pair of primary sense windings;
   A pair of secondary sense windings, said pair of primary sense windings separated by an air gap from said pair of secondary sense windings;
   At least one screen member of material capable of interrupting a magnetic drive field and adapted to be positioned in said air gap in correlation with the position of a moving member being sensed;
   Oscillator drive means applying current in parallel to said pair of primary sense windings, said current in said pair of primary sense windings electrically inducing corresponding current in said pair of secondary sense windings; and
   Circuit means providing a first signal corresponding to the sum of signals from said pair of secondary sense windings, said circuit means providing a second signal corresponding to the difference of signals from said pair of secondary sense windings, said first signal corresponding to a maximum value and said second signal corresponding to a minimum value, when said screen member being outside the air gap and said second signal corresponding to a minimum value again when said screen member is located at a certain position within the air gap, said circuit means further providing an indication when said screen member is located at said certain position within the air gap.

3. A position sensor according to claim 2, wherein said circuit means performs a minimum signal test on said first signal by comparing said first signal to a reference signal and a null signal test on said second signal and combines the results in an AND circuit, said AND circuit generating said indication when said screen member is located at a certain position within the air gap.

4. A method for sensing the position of a moving member comprising the steps of:
   (a) positioning a pair of primary sense windings near a pair of secondary sense windings, said primary and secondary sense windings separated by an air gap;
   (b) coupling a screen member with said moving member, said screen member being of material capable of interrupting a magnetic drive field and adapted to be positioned in said air gap in correlation with the position of said moving member being sensed;

(c) Applying oscillating current in parallel to said pair of primary sense windings, and inducing current in said pair of secondary sense windings;

(d) detecting the presence of said screening member within said air gap; and (e) providing an indication when said screen member is located at a certain position within said air gap.

5. A method according to claim 4, further comprising the steps of;

(a) providing a first signal corresponding to the sum of signals from said pair of secondary sense windings;

(b) providing a second signal corresponding to the difference of signals from said pair of secondary sense windings, wherein said first signal correspond to a maximum value and said second signal correspond to a minimum value when said screen member being outside the air gap, and said second signal correspond to a minimum again when said screen member is located at a certain position within the air gap.

6. A method according to claim 5, further including the steps of:

(a) performing a minimum signal test on said first signal by comparing said first signal to a reference signal;

(b) performing a null test on said second signal such that minimum value of said second signal is determined; and (c) combining the results in an AND circuit, said AND circuit generating said indication when said screen member is located at a certain position within the air gap.

* * * * *